United States Patent
Hibbert et al.

(10) Patent No.: US 8,050,181 B2
(45) Date of Patent: Nov. 1, 2011

(54) SLIDING FRAME COMPARATOR IN A NETWORK DIAGNOSTIC DEVICE

(75) Inventors: Geoffrey T. Hibbert, San Jose, CA (US); George A. Bullis, Glendora, CA (US); Andrew J. Milne, Sierra Madre, CA (US); Steven R. Klotz, Austin, TX (US)

(73) Assignee: JDS Uniphase Corporation, Milpitas, CA (US)

( * ) Notice: Subject to any disclaimer, the term of this patent is extended or adjusted under 35 U.S.C. 154(b) by 522 days.

(21) Appl. No.: 11/675,039

(22) Filed: Feb. 14, 2007

(65) Prior Publication Data

US 2007/0189173 A1 Aug. 16, 2007

Related U.S. Application Data

(60) Provisional application No. 60/773,507, filed on Feb. 14, 2006.

(51) Int. Cl.
*G01R 31/08* (2006.01)
(52) U.S. Cl. ......... 370/242; 370/471; 370/476; 370/252
(58) Field of Classification Search ................ 370/471, 370/473, 476, 252; 340/146.2
See application file for complete search history.

(56) References Cited

U.S. PATENT DOCUMENTS

| 5,525,982 | A | * | 6/1996 | Cheng et al. ............... 341/51 |
| 5,961,640 | A | * | 10/1999 | Chambers et al. ........... 712/300 |
| 2005/0071493 | A1 | * | 3/2005 | Lee ........................... 709/232 |
| 2006/0098320 | A1 | * | 5/2006 | Koga et al. ................. 360/53 |
| 2007/0124415 | A1 | * | 5/2007 | Lev-Ran et al. ............ 709/217 |

* cited by examiner

*Primary Examiner* — Huy Vu
*Assistant Examiner* — Omer Mian
(74) *Attorney, Agent, or Firm* — Volentine & Whitt, PLLC

(57) ABSTRACT

A network diagnostic component that is placed in-line between a first and second node. The diagnostic component is used to perform a comparison operation on any specified portion of a network data frame. For example, the first node may communicate with the second node using a network data frame that includes one or more data units. The network diagnostic component uses a starting and ending address that specify where in the network data frame to begin and end the comparison operation. A match template that specifies a particular condition for comparison is also used. The network diagnostic component then performs the comparison operation by searching for a data unit that at least partially matches the comparison condition in the portion of the network data frame specified by the starting and ending addresses. The data unit may be located at any location in the specified portion of the data frame.

27 Claims, 3 Drawing Sheets

SLIDING FRAME COMPARATOR IN A NETWORK DIAGNOSTIC DEVICE

CROSS-REFERENCE TO RELATED APPLICATIONS

This application claims the benefit of U.S. Provisional Application No. 60/773,507, filed Feb. 14, 2006, which is incorporated herein by reference in its entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and Infini-Band networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate to a network diagnostic device or component that is placed in-line between two nodes in a network to perform a comparison operation on any specified portion of a data frame. For example, the network diagnostic component receives a network data stream from a first node for communication with a second node. The network data stream includes one or more data units.

The network diagnostic component uses a starting address and an ending address that specify where in the data frame a comparison operation should begin and end at respectively. The network diagnostic device further uses a match template that specifies a particular condition for comparison.

A comparison operation may then be performed by searching for a data unit in the portion of the data frame specified by the beginning and ending addresses that at least partially matches the comparison condition of the match template. The data unit may occur in any location within the specified portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The embodiments disclosed herein relate to a network diagnostic component or device that is placed in-line between a first and second node. The diagnostic component or device is used to perform a comparison operation on any specified portion of a network data frame. For example, the first node may communicate with the second node using a network data frame that includes one or more data units. In some embodiments, the network frame may be of the SAS/SATA protocol. The network diagnostic component may use a starting and ending address that specify where in the network data frame to begin and end the comparison operation. A match template that specifies a particular condition for comparison is also used. The network diagnostic component then performs the comparison operation by searching for a data unit that at least partially matches the comparison condition of the match template in the portion of the network data frame specified by the starting and ending addresses. The data unit may be located at any location in the specified portion of the data frame.

The embodiments disclosed herein may be practiced in networking systems, including the testing of high speed data transmission systems and components. Embodiments described herein may also be used in other contexts unrelated to testing systems and components and/or unrelated to high speed data transmission. An example networking system will first be described. Then, the operation in accordance with specific embodiments disclosed herein will be described. Note that as used herein the terms "first", "second" and so forth are not intended to imply sequential ordering, but rather are intended to distinguish one element from another.

Example Networking System

Figure 1:
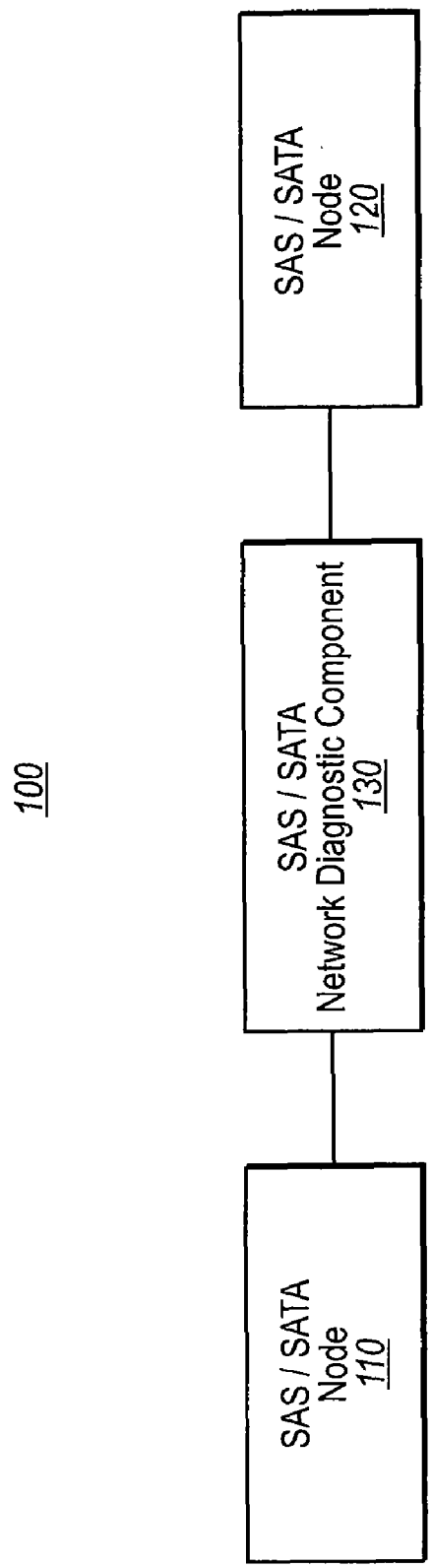
FIG. 1 illustrates a block diagram of a network including a network diagnostic component placed in-line between two nodes.

FIG. 1 is a block diagram of a networking system 100. The networking system 100 may include one or more nodes 110, 120, which communicate with each other via a network. As used herein, a "node" includes, but is not limited to, a server or host; a client or storage device; a switch; a hub; a router; all or a portion of a SAN fabric; a diagnostic device; and any other device or system, or combination thereof, that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" or "network data stream" includes, but is not limited to, a packet; a datagram; a frame; a data frame; a command frame; an ordered set; any unit of data capable of being routed (or otherwise transmitted) through a computer network; and the like. In one embodiment, a network message or data stream may comprise transmission characters used for data purposes, protocol management purposes, code violation errors, and the like. Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like. In this description and in the claims, protocol is defined to mean at least the speed at which the nodes communicate and the communication rules that are used by the nodes when communicating.

As shown in FIG. 1, the nodes 110,120 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 110,120 need not be SATA/SATA nodes and that the nodes 110,120 may be other types of nodes that are compatible with other types of network protocols. In addition, any reference to a node as being a host or initiator node and another node as being a target node is for illustration only. It is contemplated that nodes 110, 120 can be both host and target nodes as circumstances warrant.

The networking system 100 may comprise a network, network diagnostic system, a network testing system, or the like including network diagnostic components (such as network diagnostic component 130), which may be configured to communicate network messages among nodes. For example, the network diagnostic component 130 may be inserted between the nodes 110,120 such that network messages sent between the nodes 110,120 are available to network diagnostic component 130 and/or are routed through the network diagnostic component 130.

In further detail, the network diagnostic component 130 may send and receive signals or data. Accordingly, using a signal, the network diagnostic component 130 may receive one or more network messages from a node, send one or more network messages to a node, or both. For example, the network diagnostic component 130 may receive one or more network messages sent between the nodes 110,120. The network diagnostic component 130 may also retransmit those network messages. In particular, the network diagnostic component 130 may receive network messages sent from the node 1110 and then retransmit them to the node 120. Also, the network diagnostic component 130 may receive network messages sent from the node 120 and then retransmit them to the node 1110. As used herein, "in-line" denotes that a network diagnostic component is configured to have the network messages sent between two nodes routed to it so that the network messages are available to the network diagnostic component. In some embodiments the network diagnostic component may be directly in-line or it may be indirectly in-line through the use of a tap or like device. In still other embodiments, the network diagnostic component may have the network messages routed to it in any reasonable way.

Prior to retransmitting these network messages, the network diagnostic component 130 can modify the signal used to transmit the network messages. For example, the network diagnostic component 130 may digitally retime the signal, may modify the content of the messages themselves, or both. It will be appreciated that the network diagnostic component 130 may modify the signal in other desired ways. Because it is not always desirable to have the network diagnostic component 130 modify the signal, the network diagnostic component 130 may be selectively configured to modify (or not to modify) the signal used to transmit the network messages.

The network diagnostic component 130 may also perform a variety of network diagnostic functions using network messages sent between the nodes 110,120. In performing some of these diagnostic functions, the network diagnostic component 130 may be configured to be passive to the network messages. If desired, the network diagnostic component 130 may receive at least some of the network messages, and may transmit some or all of the received traffic. In performing other diagnostic functions, the network diagnostic component 130 may be configured to modify some or all of the network traffic.

As shown in FIG. 1, the network diagnostic component 130 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 130 need not be a SAS/SATA network diagnostic component and that the network diagnostic component 130 may be another type of network diagnostic component that is compatible with other types of network protocols. In fact, the network diagnostic component 130 may be configured to perform its functions on any type of network and/or network topology using any number of network protocols.

Example Frame Comparator

Figure 2:
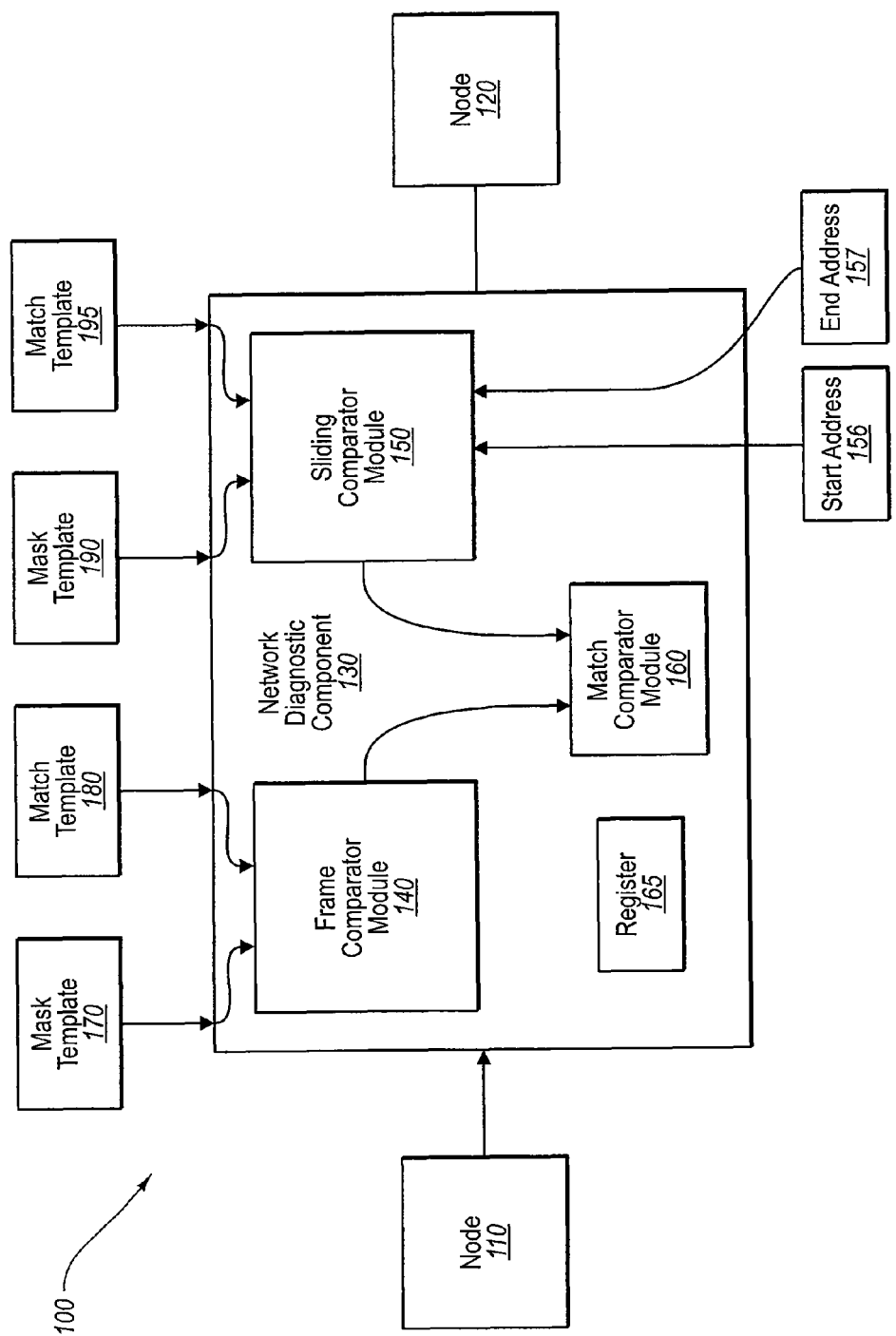
FIG. 2 illustrates a detailed view of a particular embodiment of the network diagnostic component of FIG. 1.

Referring now to FIG. 2, a specific embodiment of network 100 is illustrated. Note that the specific embodiment of FIG. 2 is for illustration only, and is not intended to limit the scope of the appended claims. As shown, network diagnostic component 130 includes a frame comparator module 140, which may be implemented as hardware, software, or any combination of the two. In some embodiments, frame comparator module 140 is implemented as a state machine.

In operation, frame comparator 140 allows a user to define a mask template 170 and a match template 180 for network diagnostic component 130 to use in looking for a particular frame type for various purposes such as triggering. These templates are generally constructed on a dword basis. Typically, a dword consists of 32 bits, while a data frame consists of a whole number of dwords.

A user may choose how many dwords deep into a network data frame 115 (hereinafter also simply referred to as frame 115) comparator module 140 should look for a match. The depth of the search determines the End Address for comparator module 140. For example, if the user desires to compare as deep as the 50$^{th}$ dword into a frame 115, the End Address is set to the 50$^{th}$ dword. The user then provides mask template 170 and match template 180 with a mask and a match value for each dword from 1 to 50, respectively. Each mask value and each match value are made up of 32 bits to allow each individual bit of the corresponding dword to be compared. For each dword, the mask value in mask template 170 is ANDed by frame comparator module 140 with the incoming dword corresponding to the mask value. For example, the mask value for dword 1 is ANDed with the actual dword 1 received by frame compare module 140. The results of the AND operation for all the specified dwords are then compared to the corresponding match values in match template 180. If at any time before the comparator 140 reaches the designated End Address (e.g., 50dwords in the current example) a mismatch is found, then the comparison is aborted and entire frame 115 is considered not a match.

While use of frame comparator module 140 is sufficient in many applications, it is often desirable to do a more refined search. For example, there may be a specific data value that a user wishes to search for inside the data payload of incoming frames. Due to variations of how data is packaged inside frame data payloads, the user often cannot be sure that a specific value will be aligned on an even dword boundary within the payload, or where in the payload it may be. In addition, the frame comparator 140 only allows match and mask values to be defined for each specific dword location in the frame, but does not allow searching for a specific value that may be found at any position in the frame. The embodiments disclosed herein allow for a sliding comparator to be implemented that allows for a more refined search.

Example Sliding Comparator Module

Referring again to FIG. 2, it is illustrated that network diagnostic component 130 may also include a sliding comparator module 150 and a match comparator module 160. Each of these modules may be implemented as hardware, software, or any combination of hardware and software. In some embodiments, these comparator modules are implemented as state machines. Sliding comparator module allows a user to define where to start a search, where to end the search, and a specific dword to match with regardless of its location in the data frame 115. This allows a user to bypass header or other data in the data frame 115 when conducting a search for desired dwords.

In operation, a user defines a Start Address 156 and an End Address 157. These values are expressed as a number of dwords deep into a frame 115. Accordingly, the Start Address 156 can be set to any desirable dword value. For example, if a header portion of a frame 115 were 20 dwords deep and a data portion of the frame 115 were 100 dwords deep, the user could specify a Start Address 156 of 21 dwords to ensure that the header portion was skipped. Likewise, the user could specify a Start Address 156 of 100 dwords deep to begin searching 80 dwords deep into the data payload portion of the frame 115. The End Address 157, on the other hand, tells the sliding comparator how deep into the frame 115 to go before ending a comparison operation. Of course in some embodiments, the Start Address 156 may simply be specified to be the start of the frame 115. In addition, in other embodiments, the Start Address 156 and the End Address 157 may be specified at a time prior to the operation of diagnostic component 130.

Sliding comparator module 150 allows a user to define a mask template 190 and a match template 195 for use in the comparison. The user provides a mask value for the desired dword(s) and a corresponding match template that specifies a comparison condition or operation. Unlike comparator 140, sliding comparator module 150 allows the user to define the mask and match templates 190 and 195 to any desired dword or portions of a dword in the portion of the data frame 115 between the defined Start Address 156 and End Address 157. Each mask value and each match template comparison condition may be made up of 32 bits to allow each individual bit of the corresponding dword to be compared. Of course, the comparison condition or operation need not simply be a single value, although in some embodiments the match template 195 may specify a single value as the comparison condition. In other embodiments, the match template 195 may specify that the comparison condition is an operation or the like. For example, the comparison condition may specify that the sliding comparator module 150 subtract five from the present Dword being read, the result being the desired comparison condition. Accordingly, the match template 195 is configured to specify any reasonable comparison condition.

The sliding comparator searches through the data frame 115 until it reaches the End Address 157 or the data frame ends because the frame 115 is shorter than the End Address 157. Any time the comparison condition of the match template and the incoming dword (or portion thereof) ANDed with the mask value are equal, a match is found. This result may then be reported to other components of network diagnostic component 130 as needed.

In some embodiments, sliding comparator module 150 is configured to compare at or work on byte boundaries. As mentioned previously, data frames are typically aligned to dword, or 4 byte, boundaries. Accordingly, there may be four four-byte wide sections that the sliding comparator may compare at or work on. For example, the sliding comparator 150 may compare at or work on a first section consisting of the four bytes of one dword. The sliding comparator 150 may also compare at or work on a second section consisting of the last three bytes of one dword combined with the first byte of the next dword in the frame 115. The sliding comparator 150 may further work on or compare at a third section consisting of the last two bytes of one dword and the first two bytes of the next dword in the frame 115. Finally, the sliding comparator 150 may compare at or work on a fourth section consisting of the last byte of one dword and the first three bytes of the next dword in the frame 115. In such embodiments, if the End Address has not been reached when all four sections have been compared, the process begins again. Accordingly, configuring the sliding comparator to work on byte boundaries allows a user to specify a comparison of portions of two or more dwords, thus providing more flexible searching.

Of course, the sliding comparator module 150 may be configured to operate according to any variation of the previously mentioned frame data boundary alignments and comparison section widths. For example, the sliding comparator module 150 may be configured to operate on frames that are not aligned to dword, or 4 byte, boundaries, but are aligned to more or less than 4 byte boundaries. The sliding comparator module 150 may be configured to compare at or work on data sections more or less than the four bytes wide in size previously described. For example, the sliding frame comparator module 150 could be configured to compare at or work on a data section that is 2 dwords, or 8 bytes, wide that would span 2 or 3 frame data dwords at a time. The sliding comparator 150 may also compare at or work on a data section consisting of a first number of bytes of one dword combined with a second number of bytes of the next dword in the frame 115.

In other embodiments, the sliding comparator may be configured to read primitive dwords in a data frame 115 without affecting a comparison operation. In some protocols, such as SAS and SATA, data frames often consist of Data dwords interspersed with primitive dwords such as ALIGN/NOTIFY and HOLD/HOLDA. In such cases, the sliding comparator typically ignores the primitives and compares the Data dwords only.

For example, suppose that a data frame 115 included Data dword 1, Data dword 2, primitive dword, primitive dword, and Data dword 3 in that order. In that case, when the sliding comparator module 150 gets to Data dword 2, it is configured to slide directly to Data dword 3 and ignore the intervening primitive dwords. This is typically done by keeping the value of Data dword 2 latched to a register 165 that may be included in sliding comparator module 150 or contained in another portion of network diagnostic component 130. Using the register allows the value of Data dword 2 to be available to sliding comparator module 150 as long as it is needed.

Referring again to FIG. 2, match comparator module 160, which is implemented in some embodiments, is shown. In such embodiments, the results of both frame comparator module 140 and sliding comparator module 150 may be provided to match comparator module 160. The match comparator module 160 waits to see if the frame comparator module 140 matches on every dword up to its End Address and if sliding comparator module 150 finds a match somewhere between its Start Address 156 and End Address 157. If both matches are found, then match comparator module 160 determines that the data frame 115 is a match. Other operations may then be performed on the data frame 115 by various components of network diagnostic component 130.

Example Methods of Sliding Comparison

Figure 3:
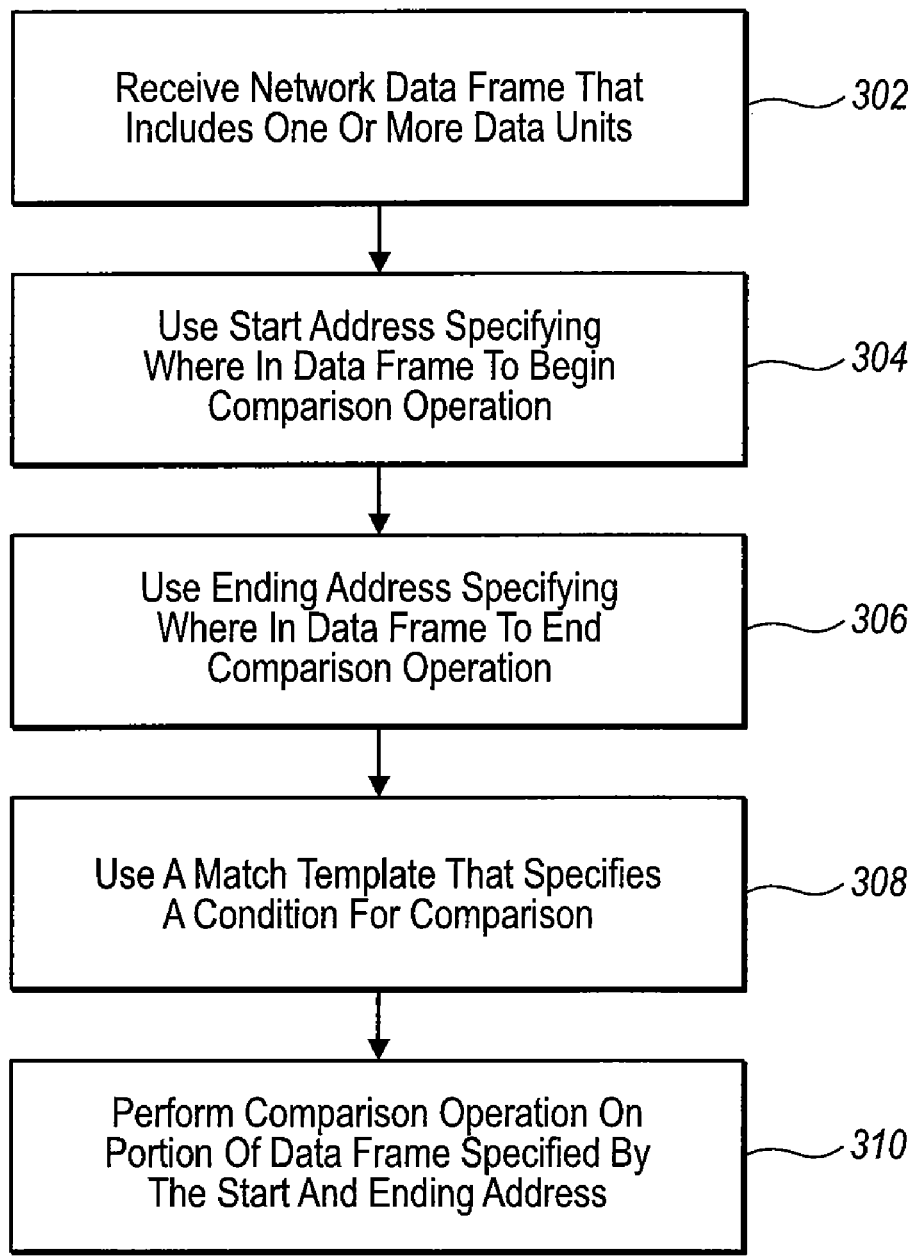
FIG. 3 illustrates a method for a network diagnostic component placed in-line between two nodes to perform a comparison operation on any specified portion of a data frame.

Referring now to FIG. 3, a flowchart of a method 300 for an in-line diagnostic component to perform a comparison operation on any specified portion of a data frame is illustrated. Method 300 will be described in relation to the network system of FIGS. 1 and 2, although this is not required. It will be appreciated that method 300 may be practiced in numerous diagnostic network systems. In some embodiments, method 300 may be performed on the fly in real time by the hardware components and modules of the network diagnostic component.

Method 300 includes an act of receiving a network data frame from the first node for communication with the second node, the network data frame comprising one or more data units (act 302). For example, network diagnostic component 130, specifically sliding comparator module 150, may receive network data stream 115 from either node 110 or node 120, which may be SAS/SATA devices. Network data stream 115 may include one or more data units such as Data dwords and may include one or more non-data units such as primitive dwords.

Method 300 also includes an act of using a starting address that specifies where in the data frame to begin a comparison operation (act 304) and an act of using an ending address that specifies where in the data frame to end the comparison operation (act 306). For example, sliding comparator module 150 may use a start address 156 that indicates where in network data stream 115 to begin the comparison operation. In like manner, the sliding comparator module 150 may use an ending address 157 that indicates where in network data stream 115 to end the comparison operation. Advantageously, the ability to define a start address and an end address allows for the comparison of Data dwords (or portions thereof) located at any portion of the data frame between the start and end addresses without having to compare data dwords that are not in the specified portion.

Method 300 further includes an act of using a match template that specifies a particular condition for comparison (act 308). For example, sliding comparator 150 may use match template 195. As described above, and in conjunction with mask template 190, the match template 195 allows a user to define a specific comparison condition for comparison.

Method 300 additionally includes an act of performing a comparison operation by searching for a data unit in the portion of the data frame specified by the starting and ending addresses that at least partially matches the comparison condition of the match template, wherein the data component may occur in any location within the specified portion of the data frame (act 310). For example, sliding comparator module 150 may perform the comparison operation by searching for a data dword (or portion thereof) contained in the specified portion of the data frame that matches the comparison condition of the match template. As mentioned, the dword being compared may be located anywhere within the specified portion of the data frame.

Example Network Diagnostic Functions

As mentioned above, the network diagnostic component 130 may perform a variety of network diagnostic functions. The network diagnostic component 130 may be configured to function as any combination of: a bit error rate tester, a protocol analyzer, a generator, a jammer, a monitor, and any other appropriate network diagnostic device.

Bit Error Rate Tester

In some embodiments, the network diagnostic component 130 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 130 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least one network message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receiving a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety.

It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 130 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y." The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 130 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 130 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 130 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC errors, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 130 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety.

Example Systems

It will be appreciated that the network diagnostic component 130 may be used to implement a variety of systems.

In one embodiment, the network diagnostic component 130 may comprise a printed circuit board. The printed circuit board may include a CPU module.

In one embodiment, the network diagnostic component 130 may comprise a blade. The blade may include a printed circuit board, an interface, or any combination thereof.

In one embodiment, the network diagnostic component 130 may comprise a chassis computing system. The chassis computing system may include one or more CPU modules, which may be adapted to interface with one, two, or more blades or other printed circuit boards. For example, a blade may have an interface though which a diagnostic module may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

In one embodiment, the network diagnostic component 130 may comprise an appliance. Depending on the particular configuration, the appliance may include any suitable combination of one or more CPU modules and one or more diagnostic modules. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, or sending information to a client software program. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 130 may comprise any of a variety of other suitable network diagnostic components.

Example Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a network diagnostic device to perform a real time comparison operation, the method comprising:
    an act of the network diagnostic device receiving a network data frame from a first node in a network for communication with a second node in the network, the network data frame comprising one or more data dwords interspersed with one or more primitive dwords, wherein the data dwords include data being transmitted from the first node to the second node and the primitive dwords include information that is used to configure the communication between the first and second nodes;
    an act of the network diagnostic device using a user-defined starting address that specifies where in the data frame to begin the comparison operation, wherein the starting address is configured to specify any single data dword as the start location regardless of its position in the data frame;
    an act of the network diagnostic device using a user-defined ending address that specifies where in the data frame to end the comparison operation, wherein the ending address is configured to specify any single data dword as the end location regardless of its position in the data frame;
    an act of the network diagnostic device using a match template that specifies a particular condition for comparison, wherein the comparison condition is configured to specify one or more of: a single data dword, a portion of a single data dword, a plurality of data dwords, and an operation that defines the comparison condition;
    an act of the network diagnostic performing a comparison operation by searching for one or more data dwords or portions of data dwords in the portion of the data frame specified by the starting and ending addresses that at least partially matches the comparison condition of the match template; and
    an act of determining any differences between the one or more data dwords or portions of data dwords in the portion of the data frame specified by the starting and ending addresses and the comparison condition of the match template to identify defects in the network;
    wherein the starting and ending addresses are expressed as a number of dwords deep into the network data frame.

2. The method in accordance with claim 1, wherein the one or more data dwords of the data frame are four bytes in size and wherein the comparison operation comprises:
    an act of the network diagnostic device comparing the four bytes of a single data dword.

3. The method in accordance with claim 1, wherein the one or more data dwords of the data frame are four bytes in size and wherein the comparison operation comprises:
    an act of the network diagnostic device comparing the last three bytes of a first data unit and the first byte of an adjoining second data dword.

4. The method in accordance with claim 1, wherein the one or more data dwords of the data frame are four bytes in size and wherein the comparison operation comprises:
    an act of the network diagnostic device comparing the last two bytes of a first data dword and the first two bytes of an adjoining second data dword.

5. The method in accordance with claim 1, wherein the one or more data dwords of the data frame are four bytes in size and wherein the comparison operation comprises:
    an act of the network diagnostic device comparing the last byte of a first data dword and the first three bytes of an adjoining second data dword.

6. The method in accordance with claim 1, wherein the network diagnostic device includes a memory, the method further comprising:
    an act of reading a first data dword;
    an act of storing the read first data dword in the memory;
    an act of reading a second data dword while ignoring primitive dwords interspersed between the first and second data dwords; and
    an act of comparing the condition specified by the match template with the first data dword in the memory and the second data dword.

7. The method in accordance with claim 1, wherein the network diagnostic component is a SAS/SATA network diagnostic device.

8. The method in accordance with claim 1, wherein the network data frame is of the SAS/SATA protocol.

9. The method in accordance with claim 1, wherein the one or more data dwords of the data frame are a plurality of bytes in size and wherein the comparison operation comprises:

an act of the network diagnostic device comparing the plurality of bytes of a single data dword.

10. The method in accordance with claim 1, wherein the one or more data dwords of the data frame are a plurality of bytes in size and wherein the comparison operation comprises:
an act of the network diagnostic device comparing a first number of bytes of a first data dword and a second number of bytes of an adjoining second data dword.

11. A network diagnostic device placed in-line between first and second nodes in a network comprising:
a processor;
a memory;
a sliding comparator module programmed to perform the following:
receive a network data frame from the first node for communication with the second node, the network data frame comprising one or more data dwords interspersed with one or more primitive dwords, wherein the data dwords include data being transmitted from the first node to the second node and the primitive dwords include information that is used to configure the communication between the first and second nodes;
use a user-defined starting address that specifies where in the data frame to begin the comparison operation, wherein the starting address is configured to specify any single data dword as the start location regardless of its position in the data frame;
use a user-defined ending address that specifies where in the data frame to end the comparison operation, wherein the ending address is configured to specify any single data dword as the end location regardless of its position in the data frame;
use a match template that specifies a particular condition for comparison, wherein the comparison condition is configured to specify one or more of: a single data dword, a portion of a single data dword, a plurality of data dwords, and an operation that defines the comparison condition; and
perform a comparison operation by searching for one or more data dwords or portions of a data dword in the portion of the data frame specified by the starting and ending addresses that at least partially matches the comparison condition of the match template; and
a bit error tester, which utilizes results of the comparison operation for determining any differences between the one or more data dwords or portions of a data dword in the portion of the data frame specified by the starting and ending addresses and the comparison condition of the match template to generate a measure of a number of errors there between or a measure of a bit error rate;
wherein the starting and ending addresses are expressed as a number of dwords deep into the network data frame.

12. The network diagnostic device in accordance with claim 11, wherein the sliding comparator module is a state machine.

13. The network diagnostic device in accordance with claim 11, further comprising:
a frame comparator module that is configured to perform a comparison operation on a determined number of data dwords of the data frame; and
a match comparator module that is configured to receive the results of the comparison operation performed by both the frame comparator module and the sliding comparator module and determine whether a successful match has occurred.

14. The network diagnostic device in accordance with claim 13, wherein the match comparator module is a state machine.

15. The network diagnostic device in accordance with claim 11, wherein the one or more data dwords of the data frame are four bytes in size and wherein the sliding comparator is further configured to:
compare the four bytes of a single data dword.

16. The network diagnostic device in accordance with claim 11, wherein the one or more data dwords of the data frame are four bytes in size and wherein the sliding comparator is further configured to:
compare the last three bytes of a first data dword and the first byte of an adjoining second data dword.

17. The network diagnostic device in accordance with claim 11, wherein the one or more data dwords of the data frame are four bytes in size and wherein the sliding comparator is further configured to:
compare the last two bytes of a first data dword and the first two bytes of an adjoining second data dword.

18. The network diagnostic device in accordance with claim 11, wherein the one or more data dwords of the data frame are four bytes in size and wherein the sliding comparator is further configured to:
compare the last byte of a first data dword and the first three bytes of an adjoining second data dword.

19. The network diagnostic device in accordance with claim 11, wherein the first and second nodes are SAS/SATA nodes and the network diagnostic component is a SAS/SATA network component.

20. The method in accordance with claim 1, wherein the network diagnostic device is one of a bit error rate tester, a protocol analyzer, a generator, a jammer, and a monitor.

21. The network diagnostic device in accordance with claim 11, wherein the one or more data dwords of the data frame are a plurality of bytes in size and wherein the sliding comparator is further configured to:
compare the plurality of bytes of a single data dword.

22. The network diagnostic device in accordance with claim 11, wherein the one or more data dwords of the data frame are a plurality of bytes in size and wherein the sliding comparator is further configured to:
compare a first number of bytes of a first data dword and a second number of bytes of an adjoining second data dword.

23. A diagnostic network comprising:
a first node;
a second node;
a network diagnostic device placed in-line between the first and second nodes comprising:
a processor; a memory; a sliding comparator module programmed to perform the following: receive a network data frame from the first node for communication with the second node, the network data frame comprising one or more data dwords interspersed with one or more primitive dwords, wherein the data dwords include data being transmitted from the first node to the second node and the primitive dwords include information that is used to configure the communication between the first and second nodes;
use a user-defined starting address that specifies where in the data frame to begin the comparison operation, wherein the starting address is configured to specify any single data dword as the start location regardless of its position in the data frame;
use a user-defined ending address that specifies where in the data frame to end the comparison operation, wherein the ending address is configured to specify any single data dword as the end location regardless of its position in the data frame; use a match template that specifies a particular condition for comparison, wherein the comparison condition is configured to specify one or more of: a single data dword, a portion of a single data dword, a plurality of data dwords, and an operation that defines the comparison condition; and perform a comparison operation by searching for one or more data dwords or portions of a data dword in the portion of the data frame specified by the starting and ending addresses that at least partially matches the comparison condition of the match template, wherein the one or more data dwords or portions of a data dword may occur in any location within the specified portion of the data frame;

a protocol analyzer for capturing the one or more data dwords or portions of a data dword in the portion of the data frame specified by the starting and ending addresses, and analyzing the captured data to diagnose data transmission faults;

wherein the starting and ending addresses are expressed as a number of dwords deep into the network data frame.

24. The diagnostic network in accordance with claim 23, wherein the first and second nodes are SAS/SATA nodes and the network diagnostic device is a SAS/SATA network component.

25. The method according to claim 1, wherein the act of determining any differences between the one or more data dwords or portions of data dwords in the portion of the data frame specified by the starting and ending addresses and the comparison condition of the match template comprises determining the total number of errors between the one or more data dwords or portions of data dwords in the portion of the data frame specified by the starting and ending addresses and the comparison condition of the match template.

26. The method according to claim 25, wherein the act of determining any differences between the one or more data dwords or portions of data dwords in the portion of the data frame specified by the starting and ending addresses and the comparison condition of the match template further comprises determining the bit error rate.

27. The method according to claim 1, wherein the act of determining any differences between the one or more data dwords or portions of data dwords in the portion of the data frame specified by the starting and ending addresses and the comparison condition of the match template comprises:

capturing the one or more data dwords or portions of data dwords in the portion of the data frame specified by the starting and ending addresses forming captured data; and analyzing the captured data to diagnose data transmission faults.

* * * * *